United States Patent
Klein et al.

(10) Patent No.: US 10,417,115 B1
(45) Date of Patent: Sep. 17, 2019

(54) SYSTEM, METHOD, AND COMPUTER PROGRAM FOR PERFORMING PRODUCTION DRIVEN TESTING

(71) Applicant: Amdocs Development Limited, Limassol (CY)

(72) Inventors: Yasmin Bel Klein, Beit Kama (IL); Dror Avrilingi, Modiin (IL); Amit Singh, Allen, TX (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/965,416

(22) Filed: Apr. 27, 2018

(51) Int. Cl.
  *G06F 11/36* (2006.01)
  *G06F 8/10* (2018.01)
  *G06F 8/71* (2018.01)

(52) U.S. Cl.
  CPC ............ *G06F 11/3664* (2013.01); *G06F 8/10* (2013.01); *G06F 8/71* (2013.01); *G06F 11/3688* (2013.01); *G06F 11/3692* (2013.01)

(58) Field of Classification Search
  CPC .......... G06F 8/10; G06F 8/71; G06F 11/3664; G06F 11/3668; G06F 11/3672; G06F 11/3676; G06F 11/368; G06F 11/3684; G06F 11/3688; G06F 11/3692; G06F 11/36–3696

(Continued)

(56) References Cited

U.S. PATENT DOCUMENTS 5,862,319 A    1/1999  Galetti
6,415,396 B1 * 7/2002  Singh .................. G06F 11/3688
                                             714/25

(Continued)

FOREIGN PATENT DOCUMENTS

CN     106844220 A     6/2017
CN     107220121 A     9/2017
WO   2015029464 A1     3/2015

OTHER PUBLICATIONS

G. Chastek, P. Donohoe, J. D. McGregor and D. Muthig, "Engineering a Production Method for a Software Product Line," 2011 15th International Software Product Line Conference, Munich, 2011, pp. 277-286. (Year: 2011).*

(Continued)

*Primary Examiner* — Andrew M. Lyons
(74) *Attorney, Agent, or Firm* — Zilka-Kotab, P.C.

(57) ABSTRACT

A system, method, and computer program product are provided for production driven testing. In operation, a system discovers production data associated with at least one project. The system designs optimized test scenarios utilizing the production data for a scoping phase, a development phase, and a testing phase associated with the at least one project. The system prioritizes tests associated with the optimized test scenarios based on the production data, test history, and development activities. Further, the system automatically executes the tests using the production data on a staging framework associated with the system. The system monitors the execution of the tests, including monitoring progress and production coverage associated with the at least one project. Moreover, the system outputs production based feedback and testing scope optimization information resulting from monitoring the execution of the tests.

9 Claims, 9 Drawing Sheets

(58) Field of Classification Search
USPC .................................................. 717/124–135
See application file for complete search history.

(56) References Cited

U.S. PATENT DOCUMENTS

| | | | | |
|---|---|---|---|---|
| 7,971,180 | B2* | 6/2011 | Kreamer | G06Q 10/06 717/101 |
| 8,561,036 | B1* | 10/2013 | Beans | G06F 11/368 717/124 |
| 8,799,714 | B1* | 8/2014 | Guruswamy | G06F 11/3684 714/25 |
| 9,141,514 | B1* | 9/2015 | Pavlovitch | G06Q 10/06395 |
| 9,229,845 | B1* | 1/2016 | Chandrasekharapuram | G06F 11/368 717/124 |
| 9,436,449 | B1* | 9/2016 | Chandnani | G06F 16/9574 |
| 9,489,288 | B1* | 11/2016 | Shama | G06F 11/3684 |
| 9,600,393 | B2* | 3/2017 | Golde | G06F 11/3612 |
| 9,727,447 | B1* | 8/2017 | Elgarat | G06F 11/3672 |
| 9,916,228 | B1* | 3/2018 | Elgarat | G06F 11/3676 |
| 9,983,981 | B1* | 5/2018 | Mundada | G06F 11/3688 |
| 10,007,598 | B2* | 6/2018 | Printz | G06F 11/3692 |
| 10,083,108 | B1* | 9/2018 | Karole | G06F 17/272 |
| 2003/0028826 | A1* | 2/2003 | Balluff | G06F 11/2294 714/44 |
| 2004/0128651 | A1* | 7/2004 | Lau | G06F 11/3664 717/124 |
| 2004/0255275 | A1* | 12/2004 | Czerwonka | G06F 11/3684 717/124 |
| 2008/0154574 | A1* | 6/2008 | Buechler | G06F 11/3696 703/26 |
| 2009/0106256 | A1* | 4/2009 | Safari | G06F 11/1433 |
| 2010/0235814 | A1* | 9/2010 | Ohta | G06F 11/3684 717/124 |
| 2010/0257513 | A1* | 10/2010 | Thirumalai | G06F 16/2365 717/134 |
| 2011/0066486 | A1* | 3/2011 | Bassin | G06Q 10/00 705/14.43 |
| 2011/0066558 | A1* | 3/2011 | Bassin | G06F 11/3616 705/301 |
| 2011/0066890 | A1* | 3/2011 | Bassin | G06F 11/3672 714/37 |
| 2011/0131031 | A1* | 6/2011 | Katz | G06F 11/3684 703/28 |
| 2011/0283147 | A1* | 11/2011 | Prasad | G06F 11/3608 714/38.1 |
| 2011/0289356 | A1* | 11/2011 | Hossain | G06F 11/3672 714/38.1 |
| 2011/0307867 | A1* | 12/2011 | Murthy | G06F 11/3684 717/125 |
| 2012/0016862 | A1* | 1/2012 | Rajan | G06F 11/3684 707/710 |
| 2012/0192153 | A1* | 7/2012 | Venkatraman | G06F 11/3664 717/124 |
| 2013/0311968 | A1* | 11/2013 | Sharma | G06Q 10/06 717/101 |
| 2014/0095233 | A1* | 4/2014 | Yeung | G06Q 10/06375 705/7.12 |
| 2014/0115403 | A1* | 4/2014 | Rhee | G06F 11/3636 714/38.1 |
| 2014/0164208 | A1* | 6/2014 | Mueller | G06Q 10/0639 705/37 |
| 2014/0172512 | A1* | 6/2014 | Chandra | G06Q 10/0637 705/7.37 |
| 2015/0154101 | A1* | 6/2015 | Perira | G06F 11/3644 717/130 |
| 2015/0261657 | A1* | 9/2015 | Kommineni | G06F 11/3676 714/38.1 |
| 2015/0261660 | A1* | 9/2015 | Shiraishi | G06F 11/3688 714/38.1 |
| 2015/0269064 | A1* | 9/2015 | Bishop | G06F 11/3684 717/124 |
| 2015/0310748 | A1* | 10/2015 | Spiegelman | G09B 5/00 434/219 |
| 2016/0004626 | A1* | 1/2016 | Jain | G06F 11/3684 717/130 |
| 2016/0062740 | A1* | 3/2016 | Muthusamy | G06F 8/71 717/121 |
| 2016/0070641 | A1* | 3/2016 | Printz | G06F 11/3692 717/124 |
| 2016/0085663 | A1* | 3/2016 | Best | G06F 11/3692 714/38.1 |
| 2016/0232080 | A1* | 8/2016 | Bhattacharya | G06F 11/3672 |
| 2016/0328316 | A1* | 11/2016 | Balsavias | G06F 11/3684 |
| 2017/0006082 | A1 | 1/2017 | Shishodia | |
| 2017/0024305 | A1* | 1/2017 | Betser | G06F 11/3612 |
| 2017/0109668 | A1 | 4/2017 | Marcu et al. | |
| 2017/0177464 | A1* | 6/2017 | Raman | G06F 11/3672 |
| 2017/0329696 | A1* | 11/2017 | Bitoun | G06F 11/3612 |
| 2018/0046570 | A1* | 2/2018 | Kaulgud | G06F 11/3676 |
| 2018/0095859 | A1* | 4/2018 | Jayaraman | G06F 11/3688 |
| 2018/0189055 | A1* | 7/2018 | Dasgupta | G06F 11/3608 |
| 2018/0196731 | A1* | 7/2018 | Moorthi | G06F 11/368 |
| 2018/0285246 | A1* | 10/2018 | Tuttle | G06F 11/3664 |
| 2018/0293156 | A1* | 10/2018 | Zeng | G06F 11/3684 |
| 2018/0300221 | A1* | 10/2018 | Barbee | G06F 11/3688 |
| 2018/0314625 | A1* | 11/2018 | Schuller | G06F 11/3672 |
| 2019/0155719 | A1* | 5/2019 | Padilla-Ruberte | G06F 11/3684 |

OTHER PUBLICATIONS

R. Dara, S. Li, W. Liu, A. Smith-Ghorbani and L. Tahvildari, "Using dynamic execution data to generate test cases," 2009 IEEE International Conference on Software Maintenance, Edmonton, AB, 2009, pp. 433-436. (Year: 2009).*

A. Furfaro, T. Gallo, A. Garro, D. Saccà and A. Tundis, "ResDevOps: A Software Engineering Framework for Achieving Long-Lasting Complex Systems," 2016 IEEE 24th International Requirements Engineering Conference (RE), Beijing, 2016, pp. 246-255. (Year: 2016).*

A. F. Nogueira, J. C. B. Ribeiro and M. Zenha-Rela, "On the Evaluation of Software Maintainability Using Automatic Test Case Generation," 2014 9th International Conference on the Quality of Information and Communications Technology, Guimaraes, 2014, pp. 300-305. (Year: 2014).*

T. R. Silva, "Definition of a Behavior-Driven Model for Requirements Specification and Testing of Interactive Systems," 2016 IEEE 24th International Requirements Engineering Conference (RE), Beijing, 2016, pp. 444-449. (Year: 2016).*

YingHui Wang, XiuQing He and QiongFang Wang, "Lifecycle based study framework of software evolution," 2010 International Conference on Computer Application and System Modeling (ICCASM 2010), Taiyuan, 2010, pp. V3-262-V3-266. (Year: 2010).*

Y. Wang, Z. Yang, Y. Ye and Y. Dou, "High-end equipment requirement generation model based on recommendation algorithm," 2017 36th Chinese Control Conference (CCC), Dalian, 2017, pp. 10113-10120. (Year: 2017).*

K. S. Yim, "Norming to Performing: Failure Analysis and Deployment Automation of Big Data Software Developed by Highly Iterative Models," 2014 IEEE 25th International Symposium on Software Reliability Engineering, Naples, 2014, pp. 144-155. (Year: 2014).*

Sonawale, W., et al., U.S. Appl. No. 15/901,772, filed Feb. 21, 2018.

Eliot, S., "A to Z Testing in Production: Industry Leading Techniques to Leverage Big Data for Quality," Software Test Professionals Conference Fall 2012 Presentation #103, Oct. 2012, 81 pages.

Eliot, S., "Testing in Production: Your Key to Engaging Customers," Software Test Professionals Conference, Mar. 23, 2011, 68 pages.

(56) References Cited

OTHER PUBLICATIONS

Shull, F., "A Brave New World of Testing? An Interview with Google's James Whittaker," IEEE Software Mar./Apr. 2012, 4 pages.

* cited by examiner

SYSTEM, METHOD, AND COMPUTER PROGRAM FOR PERFORMING PRODUCTION DRIVEN TESTING

FIELD OF THE INVENTION

The present invention relates to software and system testing, and more particularly to a system for performing production driven testing.

BACKGROUND

Current testing architectures fail to allow project activity operations to utilize production data. Moreover, current testing architectures fail to offer the ability to all users (e.g. designers, developers, architects, and testers, etc.) to perform activities on a production-like environment.

There is thus a need for addressing these and/or other issues associated with the prior art.

SUMMARY

A system, method, and computer program product are provided for production driven testing. In operation, a system discovers production data associated with at least one project. The system designs optimized test scenarios utilizing the production data for a scoping phase, a development phase, and a testing phase associated with the at least one project. The system prioritizes tests associated with the optimized test scenarios based on the production data, test history, and development activities. Further, the system automatically executes the tests using the production data on a staging framework associated with the system. The system automatically monitors the execution of the tests, including monitoring progress and production coverage associated with the at least one project. Moreover, the system outputs production based feedback and testing scope optimization information resulting from monitoring the execution of the tests.

DETAILED DESCRIPTION

Figure 1:
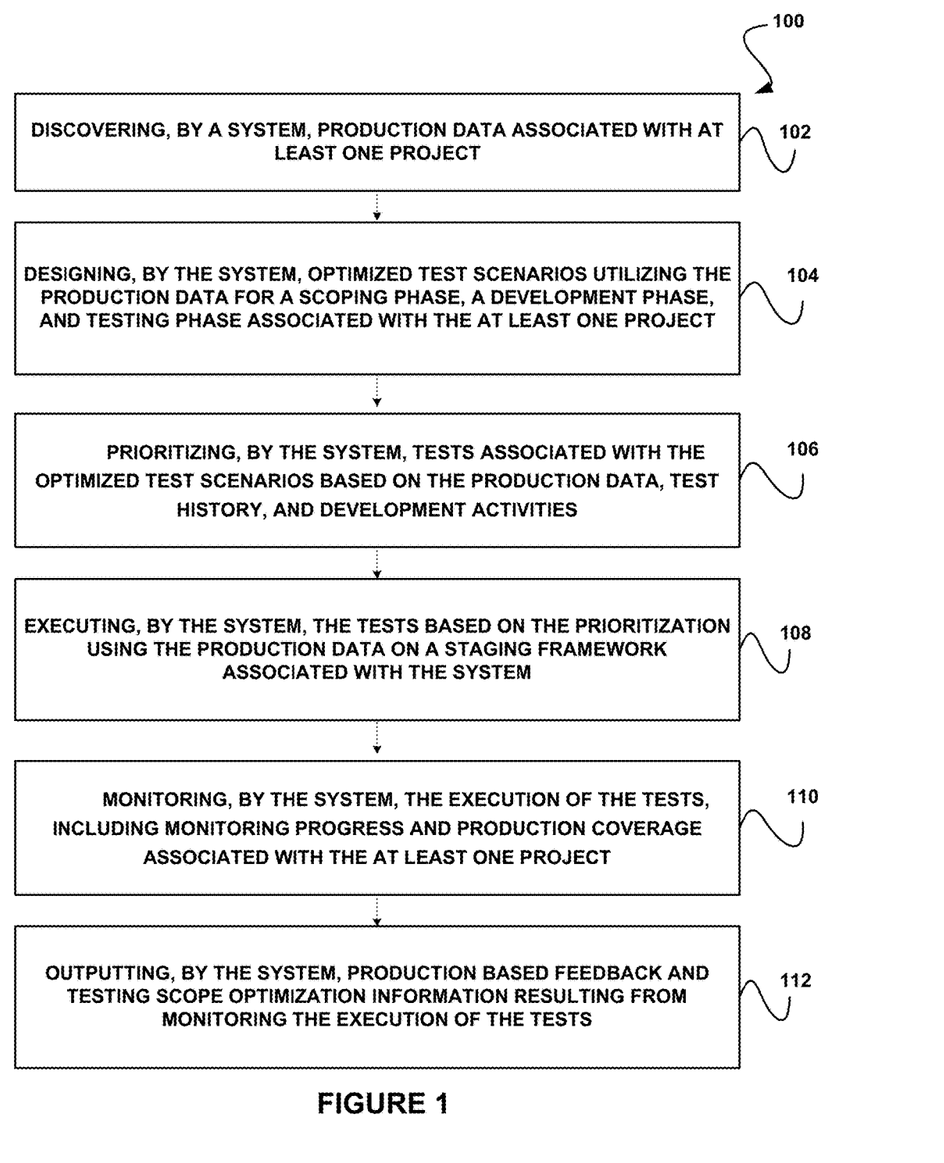
FIG. 1 illustrates a method for performing production driven testing, in accordance with one embodiment.

FIG. 1 illustrates a method 100 for production driven testing, in accordance with one embodiment.

In operation, a system discovers production data (e.g. processes, system architecture, hardware architecture information, software architecture information, transaction data, and customer data, etc.) associated with at least one project. See operation 102. The project may be associated with any industry. For example, in one embodiment, the project may be associated with the telecommunication industry. Additionally, the project may be associated with various software, applications, and systems. In one embodiment, the system may receive input (e.g. a file name, etc.) such that the system is able to identify the production data (e.g. from a user interface, etc.). In another embodiment, there may be agents or other tools that will be listening to production either by siting on the application or sniffing.

The system designs optimized test scenarios utilizing the production data for a scoping phase, a development phase, and a testing phase associated with the at least one project. See operation 104. The test scenarios may be associated with any type of testing, such as regression, progression, validation, and/or various other types of testing.

The system prioritizes tests based on the production data, test history, and development activities. See operation 106. Further, the system executes the tests using the production data on a staging framework associated with the system. See operation 108.

The system monitors the execution of the tests, including monitoring progress and production coverage associated with the at least one project. See operation 110. Moreover, the system outputs production based feedback and testing scope optimization information resulting from monitoring the execution of the tests. See operation 112. In one embodiment, outputting the production based feedback and the testing scope optimization information may include producing a real time report of readiness and testing coverage versus production behavior. In one embodiment, the system will calculate the testing scope and will prioritize based on any given parameter such as, the most generated revenue process and values, 20-80, concurrency, etc.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
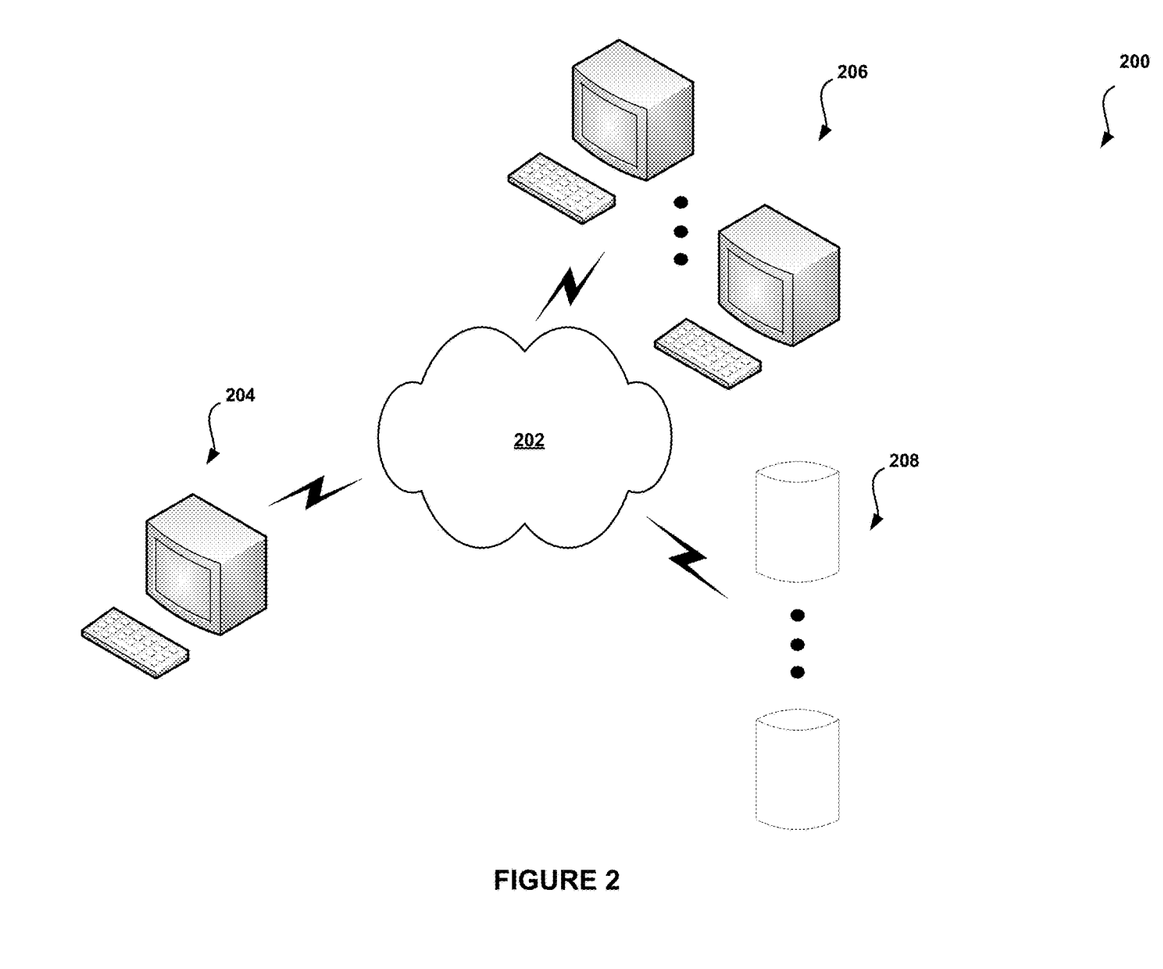
FIG. 2 shows a system for performing production driven testing, in accordance with one embodiment.

FIG. 2 shows a system 200 for performing production driven testing, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a production driven testing system 204, which may implement a variety of applications or software, etc. The system 204 may be capable of communicating with a plurality of systems 206, either directly or over one or more networks 202, for performing progression and regression testing, etc. The system 204 may also be in communication with one or more repositories/databases 208.

The production driven testing methodology implemented by the system 204 addresses the entire end-to-end (E2E) cycle of any transformation project using production data for any project activity, starting with discovery, scoping, development, and testing.

The system 204 is able to discover production data including processes, system architecture, hardware architecture, transaction data and customer data. Based on all of this information the system 204 will formulate the project scope that will be used during a scoping phase. Later in the process, system data, hardware architecture data, and data provided from production will be used for building a staging framework on which the development and testing activities will be performed.

The system 204 generates this environment that is an imitation of the production environment and will enable all users (e.g. designers, developers, architects, and testers, etc.) to perform all of their activities on a production like environment and thus be able to deliver results much faster and become familiar with the production environment, which will reduce the recovery time from any failure by knowing the environment of the new system.

In operation, the system 204 performs continuous discovery and exploration by gathering business requirements, software and hardware architectures, BI data and analytics based on production. The system 204 performs continuous design by automatic creation and ongoing design of optimized scenarios for scope, development, and testing. Further, the system 204 performs testing prioritization based on engine analysis.

The system 204 performs a full testing execution cycle on a staging framework using data pulled out from production based on testing scope. Additionally, the system performs continuous monitoring of testing execution, progress and production coverage. The system 204 may produce batch and/or on demand real time reports of system readiness and testing coverage versus production behavior. Furthermore, the system 204 may provide continuous production based feedback and testing scope optimization (i.e. analytics).

Figure 3:
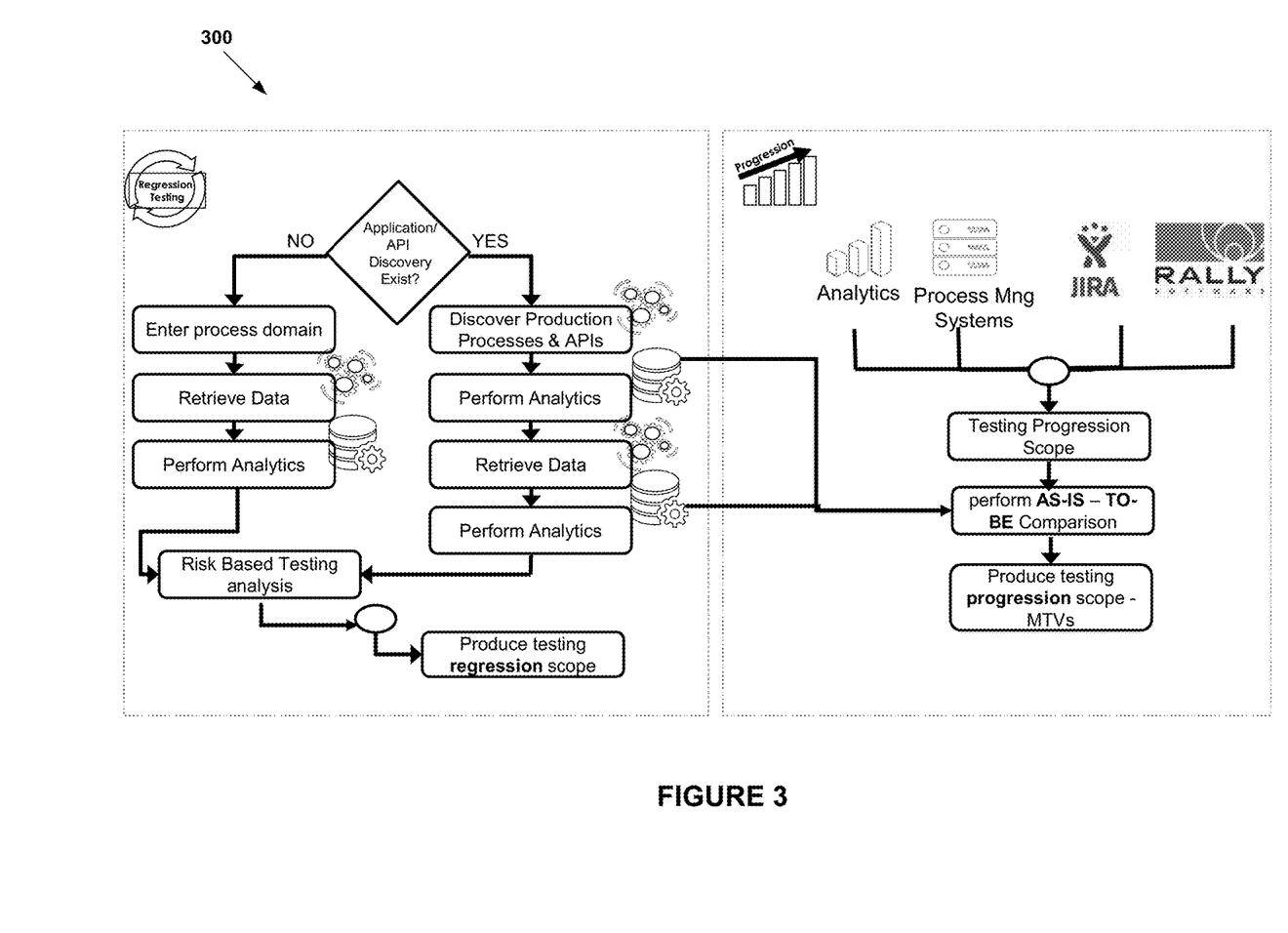
FIG. 3 shows a system flow diagram for performing product driven testing, in accordance with one embodiment.

FIG. 3 shows a system flow diagram 300 for performing product driven testing, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown, as part of regression testing, it is determined whether application and/or API discovery has been implemented or is an option. If it has not, a process domain is entered, the system retrieves data, performs analytics, and then performs risk based testing analysis. If application and/or API discovery is an option, the system discovers production processes and APIs. The system then performs analytics, retrieves the data, performs additional analytics, and performs risk based testing analysis. The system then produces a testing regression scope.

The system may automatically integrate with production to produce optimized testing scenarios. The system may also automatically integrate with production to analyze and use data in regression testing. Moreover, the system may perform risk based testing by combining information of the testing scenarios, source control files (CC files) analysis, and regression history. Based on the combined information, the system, maps the data to the testing scenarios, identify areas which are more risky and likely to fail during execution and create testing permutations. The system may also automatically integrate with any CI/CD tool to automatically create execution jobs and feedback the results in any Application Life Cycle Management (ALM) system or any system that manages the testing results. Additionally, the system may perform laser testing by automatically analyzing regression needs based on new requirement impacts. Further, the system may determine which code is impacted by the new functionality and automatically decide the regression scope to be executed.

As part of the progression testing, the system receives data from one or more systems (e.g. analytics systems, process management systems, JIRA, Rally, etc.). The system may auto integrate with any planning, tracking and process tools, to pull new requirements and translate them into testing scenarios. The system automatically discovers testing scripts on any source control and maps the testing scripts to the testing scenarios. The system automatically creates testing scripts based on the text in the new requirements in case no existing script exists in the source control. Further, the system compares the testing scenario parameters to the production common parameters and updates the scenario and scripts. Moreover, the system optimizes the testing scenario and creates minimal testable values (MTVs). A minimal testable value refers to any entity defined by a system during scoping that describes an integrated scope element that must be received in order to certify a scope associated with the software development project. The system may perform automatic integration with any CI/CD tool to automatically create execution jobs and feedback the results into any ALM.

More information associated with implementing application and/or API discovery, which may be implemented by the system described herein, may be found in U.S. patent application Ser. No. 15/901,772, filed Feb. 21, 2018, and titled "SYSTEM, METHOD, AND COMPUTER PROGRAM FOR AUTOMATED APPLICATION PROGRAMMING INTERFACE (API) REGRESSION TESTING", which is incorporated herein by reference.

Figure 4:
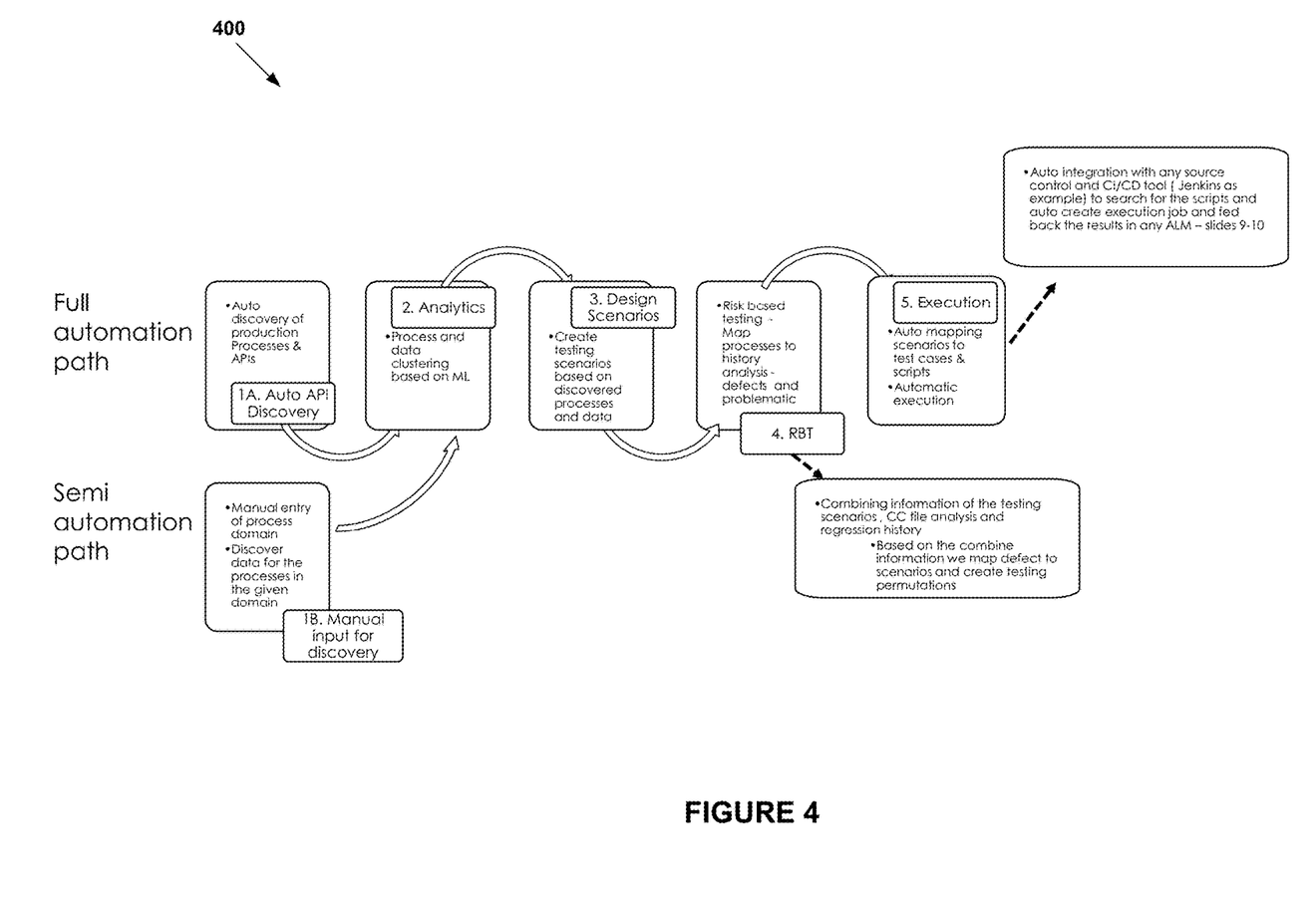
FIG. 4 shows a system flow diagram for performing product driven regression testing, in accordance with one embodiment.

FIG. 4 shows a system flow diagram 400 for performing product driven regression testing, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

The system performs auto discovery of production processes and APIs (see Step 1A). The system performs analytics including process and data clustering based on machine learning (see Step 2). The system designs scenarios by creating testing scenarios based on discovered processes and data (see Step 3). Further, the system performs risk based testing by mapping processes to history analysis (defects and problems) (See Step 4).

As part of risk based testing, the system may combine information of the testing scenarios, CC source control file analysis, and regression history and defects report. Based on the combined information, the system, maps the data to the testing scenarios, identifies areas which are more risky and likely to fail during execution and create testing permutations. The system automatically executes tests (see Step 5).

It should be noted that, in one embodiment, the system may accept manual entry of the process domain and then discover data for the processes in the given domain (see Step 1B).

Figure 5:
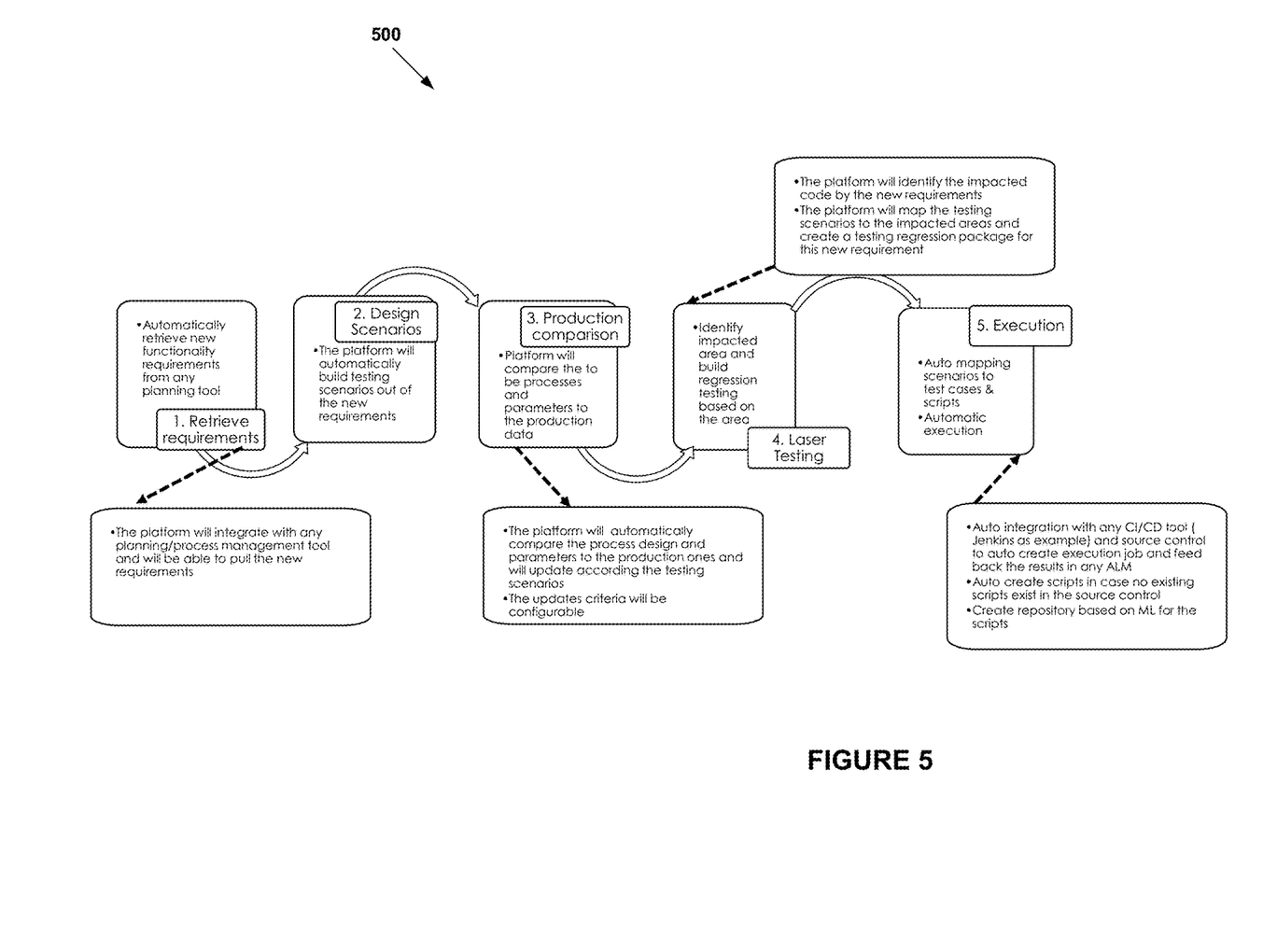
FIG. 5 shows a system flow diagram for performing product driven progression testing, in accordance with one embodiment.

FIG. 5 shows a system flow diagram 500 for performing product driven progression testing, in accordance with one embodiment. As an option, the system flow diagram 500 may be implemented in the context of the details of the previous figures and/or any subsequent figure(s). Of course, however, the system flow diagram 500 may be implemented in the context of any desired environment. Further, the aforementioned definitions may equally apply to the description below.

In operation, the system retrieves requirements by automatically retrieving new functionality requirements from any planning tool (see Step 1). The system may integrate with any planning/process management tool to pull the new requirements.

The system designs scenarios by automatically building testing scenarios out of the new requirements (see Step 2). The system then performs a production comparison by comparing the "to be" processes and parameters to the production data (see Step 3). The system may automatically compare the process design and parameters to the production design and may update the testing scenarios, process and parameters based on the production inputs. The updates criteria may be configurable. In one embodiment, the user may define the production modification criteria and the system will perform the updated automatically based on these inputs.

The system will be able to map (and compare) the ASIS and TOBE regardless if the same application/system/method/functionality exists in production or not. In case of transformation, the system will be able to pull the existing data, analyze it and compare the process and parameter to the new functionality based on ML. The system will create automatically the mapping between the existing entities and process from application 'A' to the new processes and entities from application B'.

Further, in case the system is already installed, and a new requirement is an enhancement, the system performs laser testing by identifying impacted areas of the new requirements and builds regression testing based on the areas (see Step 4). The system will identify the impacted code by the new requirements and map the testing scenarios to the impacted areas and create a testing regression package for this new requirement.

The system automatically maps scenarios to test cases and scripts and automatically executes the tests and pulls back the result to any ALM or tracking tool (see Step 5).

The system may automatically integrate with any CI/CD tool (e.g. Jenkins, etc.) and source control to automatically create execution jobs and feedback the results in any ALM. The system may automatically create scripts in the case no existing scripts exist in the source control. Based on the requirement description, the system will analyze the requirements and be able to assemble a new script in case one does not exist. The system may also create a repository based on machine learning for the scripts and chains/features that were found and executed.

Figure 6:
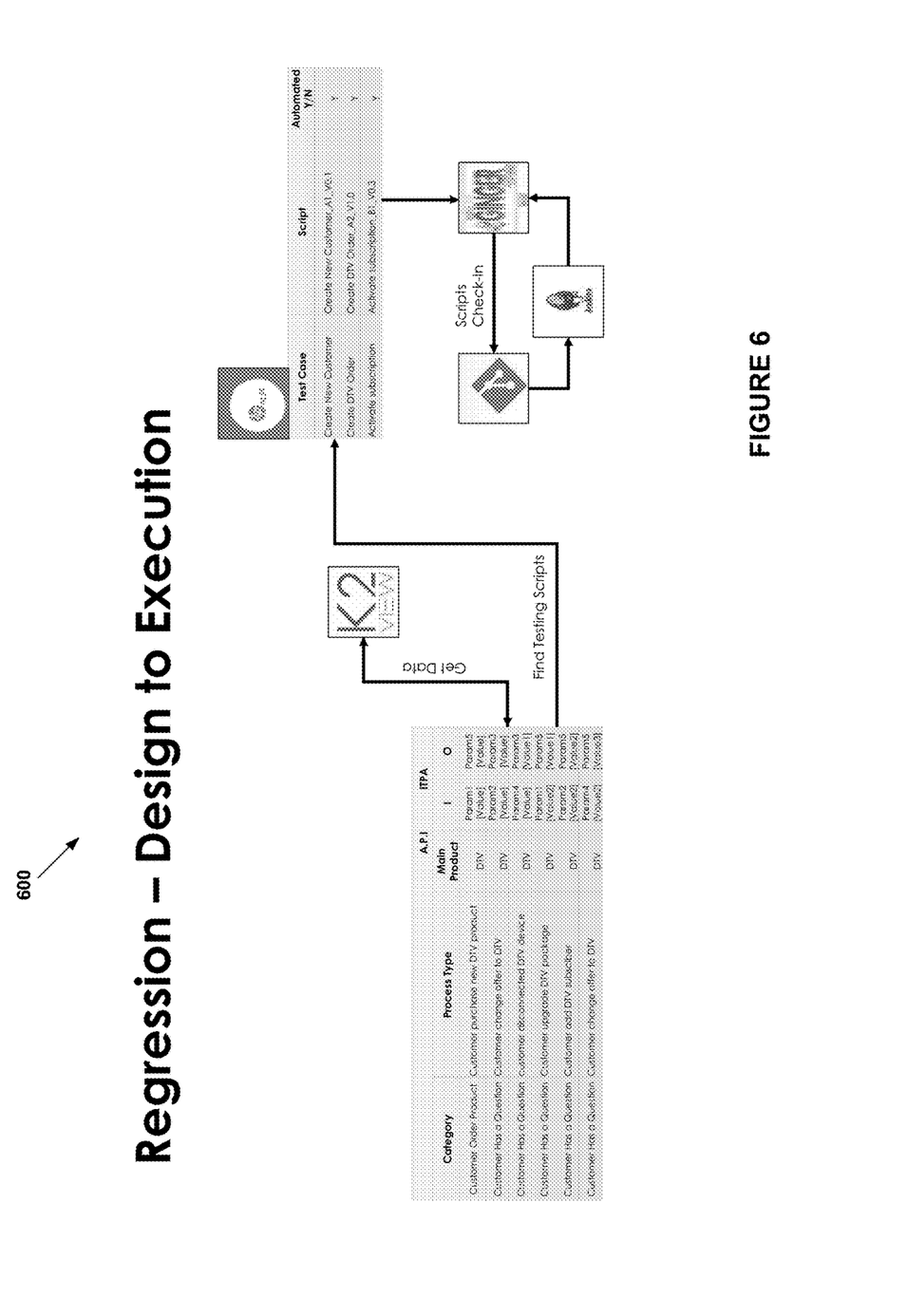
FIG. 6 shows a system flow diagram for performing regression testing, from design to execution, in accordance with one embodiment.

FIG. 6 shows a system flow diagram 600 for performing regression testing from design to execution, in accordance with one embodiment. As an option, the system flow diagram 600 may be implemented in the context of the details of the previous figures and/or any subsequent figure(s). Of course, however, the system flow diagram 600 may be implemented in the context of any desired environment. Further, the aforementioned definitions may equally apply to the description below.

As shown, the system designs scenarios by creating testing scenarios based on discovered processes and data. Further, the system performs risk based testing by mapping processes to historical analysis (defects and problems).

As part of risk based testing, the system may combine information of the testing scenarios, CC file analysis, and regression history. Based on the combined information, the system may map defects to scenarios and create testing permutations for the areas which are more risky and likely to fail.

Figure 7:
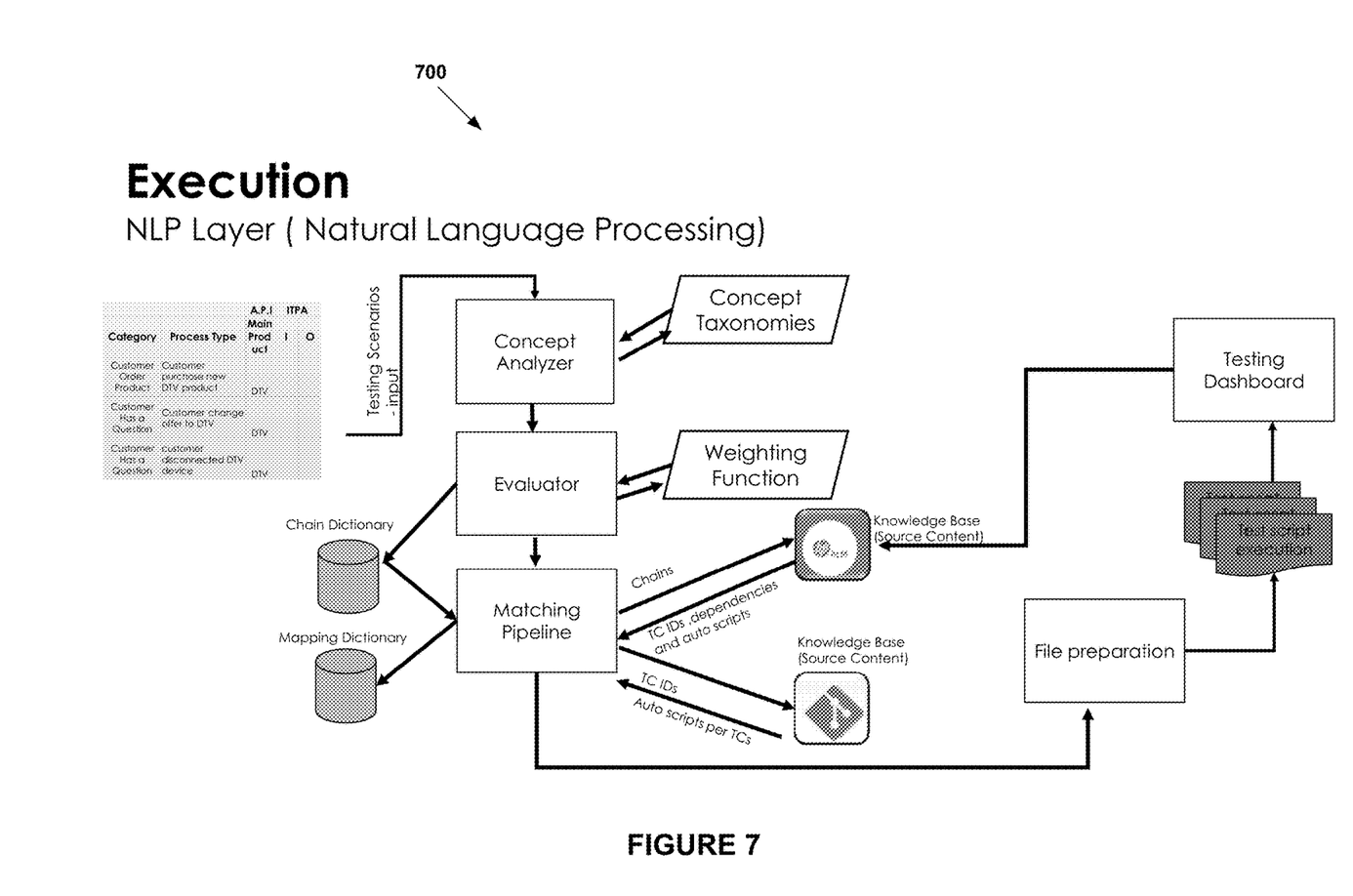
FIG. 7 shows a system flow diagram for system execution, in accordance with one embodiment.

FIG. 7 shows a system flow diagram 700 for system execution, in accordance with one embodiment. As an option, the system flow diagram 700 may be implemented in the context of the details of the previous figures and/or any subsequent figure(s). Of course, however, the system flow diagram 700 may be implemented in the context of any desired environment. Further, the aforementioned definitions may equally apply to the description below.

As shown, the system utilizes machine learning to design scenarios by creating testing scenarios based on discovered processes and data. The system performs risk based testing by mapping processes to historical analysis.

The system may combine information from the testing scenarios, CC file analysis, and regression history and defects, and based on the combined information, the system will analyze and mark the areas which are risky and more likely to fail in the execution and create testing permutations for the risky scenarios and areas. The system then automatically finds the scripts and executes the tests/scripts.

The system is able to orchestrate the execution, as well as manage dependency and execution of different types of scripts, execution tools and manual execution. It will monitor the execution progress and dependencies between the scripts.

Figure 8:
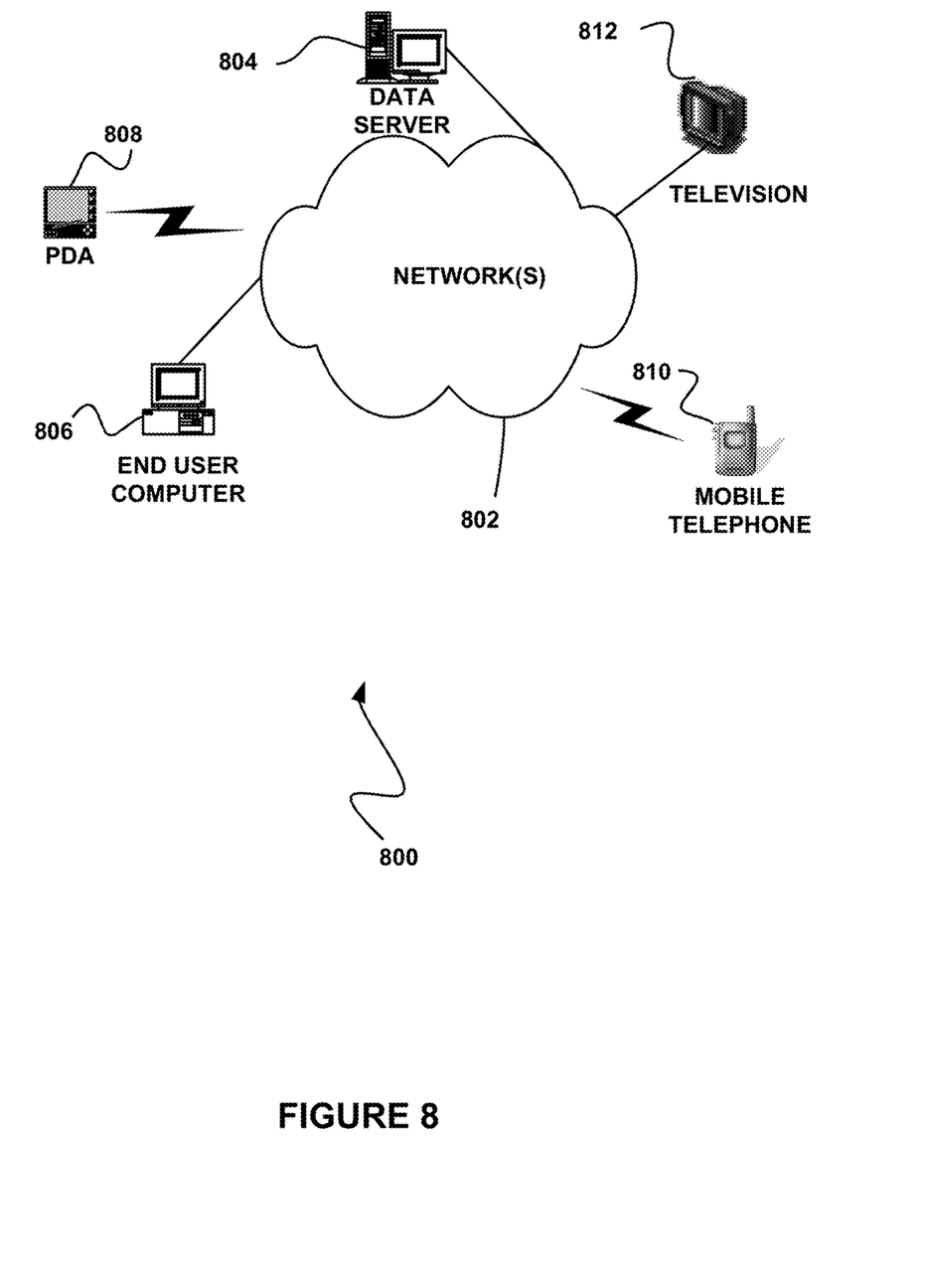
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
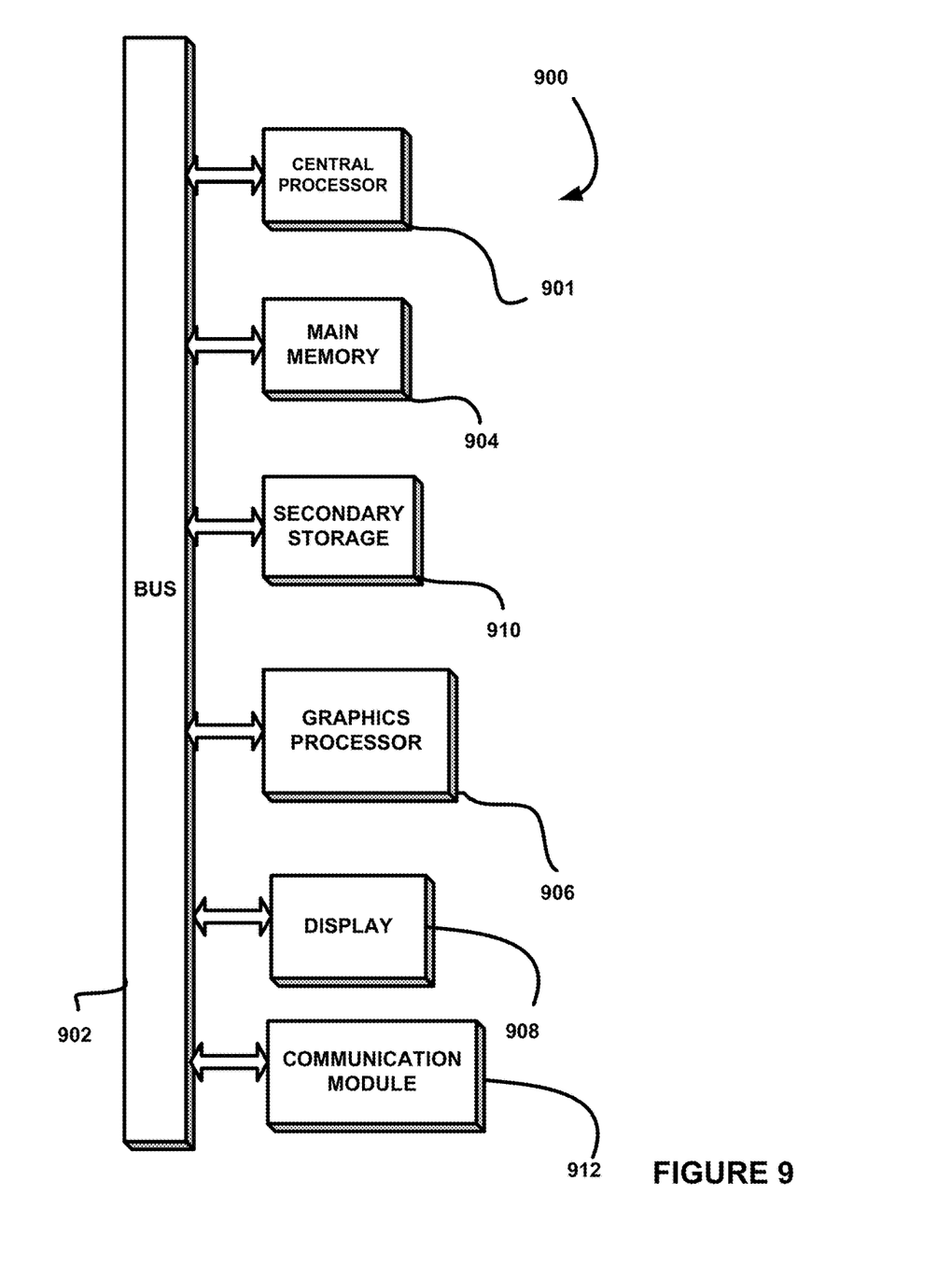
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   discovering, by a system, production data associated with a project, the production data including processes, system architecture, hardware architecture, transaction data and customer data;
   translating, by the system, requirements associated with the production data into test scenarios;
   generating a set of testing scripts for the test scenarios, the set of testing scripts including one or more existing testing scripts;
   updating the test scenarios and the testing scripts in the set of testing scripts based on a comparison of parameters of the test scenarios to parameters associated with the production data;
   optimizing, by the system, the test scenarios for a scoping phase, a development phase, and a testing phase associated with the project;
   prioritizing, by the system, the testing scripts associated with the optimized test scenarios based on the production data, test history, and development activities;
   building, by the system, a staging framework based on the system architecture and the hardware architecture included in the production data;
   executing, by the system, the testing scripts based on the prioritization using the production data on the staging framework associated with the system;
   monitoring, by the system, the execution of the testing scripts, including monitoring progress and production coverage associated with the project; and
   outputting, by the system, production based feedback and testing scope optimization information resulting from monitoring the execution of the testing scripts.

2. The method of claim 1, wherein the system performs risk based testing by combining information associated with the testing scenarios, source control file analysis, and regression history and maps the combined information to the testing scenarios, identifying areas that are more risky and likely to fail during execution.

3. The method of claim 1, wherein the system performs laser testing by automatically analyzing regression needs based on new requirement impacts.

4. The method of claim 1, wherein outputting the production based feedback and the testing scope optimization information includes producing a real time report of readiness and testing coverage versus production behavior.

5. A computer program product embodied on a non-transitory computer readable medium, comprising computer code for:
   discovering, by a system, production data associated with a project, the production data including processes, system architecture, hardware architecture, transaction data and customer data;
   translating, by the system, requirements associated with the production data into test scenarios;
   generating a set of testing scripts for the test scenarios, the set of testing scripts including one or more existing testing scripts;
   updating the test scenarios and the testing scripts in the set of testing scripts based on a comparison of parameters of the test scenarios to parameters associated with the production data;
   optimizing, by the system, the test scenarios for a scoping phase, a development phase, and a testing phase associated with the project;
   prioritizing, by the system, the testing scripts associated with the optimized test scenarios based on the production data, test history, and development activities;
   building, by the system, a staging framework based on the system architecture and the hardware architecture included in the production data;
   executing, by the system, the testing scripts based on the prioritization using the production data on the staging framework associated with the system;
   monitoring, by the system, the execution of the testing scripts, including monitoring progress and production coverage associated with the project; and
   outputting, by the system, production based feedback and testing scope optimization information resulting from monitoring the execution of the testing scripts.

6. The computer program product of claim 5, wherein the system performs risk based testing by combining information associated with the testing scenarios, source control file analysis, and regression history and maps the combined information to the testing scenarios, identifying areas that are more risky and likely to fail during execution.

7. The computer program product of claim 5, wherein the system performs laser testing by automatically analyzing regression needs based on new requirement impacts.

8. The computer program product of claim 5, wherein outputting the production based feedback and the testing scope optimization information includes producing a real time report of readiness and testing coverage versus production behavior.

9. A system, comprising one or more processors, operable for:
   discovering, by the system, production data associated with a project, the production data including processes, system architecture, hardware architecture, transaction data and customer data;
   translating, by the system, requirements associated with the production data into test scenarios;
   generating a set of testing scripts for the test scenarios, the set of testing scripts including one or more existing testing scripts;
   updating the test scenarios and the testing scripts in the set of testing scripts based on a comparison of parameters of the test scenarios to parameters associated with the production data;
   optimizing, by the system, the test scenarios for a scoping phase, a development phase, and a testing phase associated with the project;
   prioritizing, by the system, the testing scripts associated with the optimized test scenarios based on the production data, test history, and development activities;
   building, by the system, a staging framework based on the system architecture and the hardware architecture included in the production data;

executing, by the system, the testing scripts based on the prioritization using the production data on the staging framework associated with the system;

monitoring, by the system, the execution of the testing scripts, including monitoring progress and production coverage associated with the project; and outputting, by the system, production based feedback and testing scope optimization information resulting from monitoring the execution of the testing scripts.

\* \* \* \* \*